US012391215B2

United States Patent
Sunny et al.

(10) Patent No.: US 12,391,215 B2
(45) Date of Patent: Aug. 19, 2025

(54) SYSTEMS AND METHODS FOR DETECTING VEHICLE CONTROLLER SPOOFING

(71) Applicant: GM GLOBAL TECHNOLOGY OPERATIONS LLC, Detroit, MI (US)

(72) Inventors: Ahmed Sunny, Troy, MI (US); Samuel B Kupfer, Oak Park, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 256 days.

(21) Appl. No.: 18/354,717

(22) Filed: Jul. 19, 2023

(65) Prior Publication Data
US 2025/0026309 A1    Jan. 23, 2025

(51) Int. Cl.
*H04W 12/121* (2021.01)
*B60R 25/24* (2013.01)

(52) U.S. Cl.
CPC ......... *B60R 25/241* (2013.01); *H04W 12/121* (2021.01)

(58) Field of Classification Search
CPC .................................................. B60R 25/241
USPC ........................................................ 726/22
See application file for complete search history.

(56) References Cited

U.S. PATENT DOCUMENTS

| | | | |
|---|---|---|---|
| 2003/0105881 A1* | 6/2003 | Symons ................ | H04L 49/351 370/911 |
| 2005/0021649 A1* | 1/2005 | Goodman ............. | G06F 21/552 709/207 |
| 2006/0250966 A1* | 11/2006 | Su ......................... | H04L 63/101 370/248 |
| 2018/0039269 A1* | 2/2018 | Lambermont .......... | G05D 1/81 |
| 2019/0243002 A1* | 8/2019 | Song ....................... | G01S 19/20 |
| 2021/0044615 A1* | 2/2021 | Elend .................... | H04L 69/324 |
| 2023/0231864 A1* | 7/2023 | Yasmin ............... | H04L 63/1425 726/22 |
| 2024/0048587 A1* | 2/2024 | Woodworth ........ | H04L 63/1425 |

* cited by examiner

*Primary Examiner* — Michael S McNally
(74) *Attorney, Agent, or Firm* — Ingrassia Fisher & Lorenz, LLP

(57) ABSTRACT

Methods and systems are provided for detecting vehicle controller spoofing. The vehicle includes a plurality of vehicle controllers, a vehicle network switch, and a content addressable memory (CAM). The plurality of vehicle controllers includes first and second vehicle controllers. A first port of the vehicle network switch is designated to only receive data frames from a first vehicle controller. The first vehicle controller is associated with a first media access control (MAC) address. The CAM is configured to store an association between the first port and the first MAC address, receive a first data frame including a source MAC address at the first port, determine whether the source MAC address matches the first MAC address, and generate an anomaly event based on the determination. A generated anomaly event indicates that the first vehicle controller is masquerading as the second vehicle controller using an invalid source MAC address.

20 Claims, 5 Drawing Sheets

SYSTEMS AND METHODS FOR DETECTING VEHICLE CONTROLLER SPOOFING

INTRODUCTION

The technical field generally relates to vehicles, and more particularly relates to systems and methods for detecting vehicle controller spoofing.

Software-defined vehicles (SDVs) with dynamically configurable networks introduce a revolutionary approach to automotive network topologies and communication. However, they also bring about new security challenges. One particular vulnerability involves attacks targeting a vehicle controller. In this scenario, a compromised vehicle controller falls under adversarial control, aiming to impersonate a legitimate vehicle controller in order to bypass internal access controls. Exploiting this type of control allows malicious actors to escalate their privileges and execute a wide range of attacks on an SDV, ranging from causing driver inconvenience to compromising the safety of the vehicle itself.

Accordingly, it is desirable to provide improved methods and systems to detect vehicle controller spoofing. Other desirable features and characteristics will become apparent from the subsequent detailed description and the appended claims, taken in conjunction with the accompanying drawings and the foregoing technical field and background.

SUMMARY

A method for detecting vehicle controller spoofing in a vehicle includes: receiving a first data frame including a source MAC address at a first port of a plurality of ports of a vehicle network switch; retrieving a stored association between the first port and a first media access control (MAC) address from at least one memory, wherein the first port is designated to only receive data frames from a first vehicle controller of a plurality of vehicle controllers in the vehicle and the first vehicle controller is associated with the first MAC address; determining whether the source MAC address is an invalid source MAC address based on a comparison of the source MAC address with the first MAC address; and generating an anomaly event based on the determination, wherein the anomaly event is indicative of the first vehicle controller masquerading as a second vehicle controller of the plurality of vehicle controllers using a second MAC address as the source MAC address, the second MAC address being associated with the second vehicle controller.

In various embodiments, the method further includes: retrieving a stored association between the first vehicle controller and a first Internet Protocol (IP) address from the at least one memory; determining whether a source IP address received in the first data frame is an invalid source IP address based on whether the source IP address matches the first IP address; and generating a qualified security event based on the determination, wherein the qualified security event indicates that the first vehicle controller is masquerading as the second vehicle controller using a second IP address as the source IP address, the second IP address being associated with the second vehicle controller.

In various embodiments, the method further includes: retrieving a stored association between the first vehicle controller and a payload size threshold from the at least one memory, the first vehicle controller being configured to transmit payloads having a payload size that are less than or equal to the payload size threshold; determining whether a first payload size of a first payload received in the first data frame is greater than the payload size threshold; and generating a qualified security event indicating that the first vehicle controller, masquerading as the first second controller, is transmitting payloads having an invalid payload size based on the determination.

In various embodiments, the method further includes: retrieving a stored association between the first vehicle controller and a message rate threshold from the at least one memory, the first vehicle controller being configured to transmit the data frames at message rates that are less than or equal to the message rate threshold; determining whether a source message rate associated with the first data frame is greater than the message rate threshold; and generating a qualified security event indicating that the first vehicle controller, masquerading as the second vehicle controller, is transmitting the data frames at an invalid message rate based on the determination.

In various embodiments, the method further includes: retrieving a stored association between the first vehicle controller and at least one destination MAC address from the at least one memory, wherein the first vehicle controller is configured to transmit the data frames comprising one of the at least one destination MAC address and each of the at least one destination MAC address is associated with a destination device; determining whether a first destination MAC address received in the first data frame matches one of the at least one destination MAC addresses associated with the first vehicle controller; and generating a qualified security event indicating that the first vehicle controller, masquerading as the second vehicle controller, is transmitting the data frames using an invalid destination MAC address based on the determination.

In various embodiments, the method further includes: retrieving a stored association between the first vehicle controller and at least one destination IP address from the at least one memory, wherein the first vehicle controller is configured to transmit the data frames comprising one of the at least one destination IP address and each of the at least one destination IP address is associated with a destination device; determining whether a first destination IP address received in the first data frame matches one of the at least one destination IP addresses associated with the first vehicle controller; and generating a qualified security event indicating that the first vehicle controller, masquerading as the second vehicle controller, is transmitting the data frames using an invalid destination IP address based on the determination.

In various embodiments, the method further includes suspending routing of data frames including the source MAC address received at the first port upon the generation of the anomaly event.

In various embodiments, the method further includes: receiving the first data frame associated with the anomaly event from a content addressable memory (CAM) of the vehicle network switch; identifying at least one anomalous characteristic associated with the first vehicle controller masquerading as the second vehicle controller, based on the first data frame; transmitting a qualified security event including the at least one anomalous characteristic to a security back office for further analysis.

In various embodiments, the at least one anomalous characteristic includes the invalid source MAC address and at least one of an invalid source IP address, an invalid payload size, an invalid message rate, an invalid destination MAC address, and an invalid destination IP address.

In various embodiments, receiving the first data frame associated with the anomaly event from the CAM of the vehicle network switch includes receiving the first data frame associated with the anomaly event from a ternary content addressable memory (TCAM) of the vehicle network switch.

A vehicle configured to detect vehicle controller spoofing includes a plurality of vehicle controllers, a vehicle network switch, and a content addressable memory (CAM). The plurality of vehicle controllers includes first and second vehicle controllers. The vehicle network switch includes a plurality of ports, wherein a first port of the plurality of ports is designated to only receive data frames from the first vehicle controller and the first vehicle controller is associated with a first media access control (MAC) address. The CAM is configured to: receive a first data frame including a source MAC address at the first port; retrieve a stored association between the first port and the first MAC address; determine whether the source MAC address is an invalid source MAC address based on a comparison of the source MAC address with the first MAC address; and generate an anomaly event based on the determination, wherein the anomaly event is indicative of the first vehicle controller masquerading as the second vehicle controller using a second MAC address as the source MAC address, the second MAC address being associated with the second vehicle controller.

In various embodiments, the vehicle includes an intrusion assessment system and wherein: the first vehicle controller is associated with a first Internet Protocol (IP) address; the CAM is configured to transmit the first data frame associated with the anomaly event to the intrusion assessment system, the first data frame including a source IP address; and the intrusion assessment system is configured to: retrieve a stored association between the first vehicle controller and the first IP address from at least one memory at the intrusion assessment system; determine whether the source IP address is an invalid source IP address based on whether the source IP address matches the first IP address; and generate a qualified security event based on the determination, wherein the qualified security event indicates that the first vehicle controller is masquerading as the second vehicle controller using a second IP address, the second IP address being associated with the second vehicle controller.

In various embodiments, the vehicle includes an intrusion assessment system and wherein: the first vehicle controller is configured to transmit payloads having a payload size that are less than or equal to a payload size threshold; the CAM is configured to transmit the first data frame associated with the anomaly event to the intrusion assessment system, the first data frame including a first payload; and the intrusion assessment system is configured to: retrieve a stored association between the first vehicle controller and the payload size threshold from at least one memory at the intrusion assessment system; determine whether a first payload size of the first payload is greater than the payload size threshold; and generate a qualified security event indicating that the first vehicle controller, masquerading as the second vehicle controller, is transmitting payloads having an invalid payload size based on the determination.

In various embodiments, the vehicle includes an intrusion assessment system and wherein: the first vehicle controller is configured to transmit the data frames at message rates that are less than or equal to a message rate threshold; the CAM is configured to transmit the first data frame associated with the anomaly event to the intrusion assessment system; and the intrusion assessment system is configured to: retrieve a stored association between the first vehicle controller and the message rate threshold from at least one memory at the intrusion assessment system; determine whether a source message rate associated with the first data frame is greater than the message rate threshold; and generate a qualified security event indicating that the first vehicle controller, masquerading as the second vehicle controller, is transmitting the data frames at an invalid message rate based on the determination.

In various embodiments, the vehicle includes an intrusion assessment system and wherein: the first vehicle controller is configured to transmit the data frames comprising one of at least one destination MAC address, each of the at least one destination MAC address being associated with a destination device; the CAM is configured to transmit the first data frame associated with the anomaly event to the intrusion assessment system, the first data frame including a first destination MAC address; and the intrusion assessment system is configured to: retrieve stored associations between the first vehicle controller and the at least one destination MAC address from at least one memory at the intrusion assessment system; determine whether the first destination MAC address matches one of the at least one destination MAC addresses associated with the first vehicle controller; and generate a qualified security event indicating that the first vehicle controller, masquerading as the second vehicle controller, is transmitting the data frames using an invalid destination MAC address based on the determination.

In various embodiments, the vehicle includes an intrusion assessment system and wherein: the first vehicle controller is configured to transmit the data frames comprising one of at least one destination IP address, each of the at least one destination IP address being associated with a destination device; the CAM is configured to transmit the first data frame associated with the anomaly event to the intrusion assessment system, the first data frame including a first destination IP address; and the intrusion assessment system is configured to: retrieve stored associations between the first vehicle controller and the at least one destination IP address from at least one memory at the intrusion assessment system; determine whether the first destination IP address matches one of the at least one destination IP addresses associated with the first vehicle controller; and generate a qualified security event indicating that the first vehicle controller, masquerading as second first vehicle controller, is transmitting the data frames using an invalid destination IP address based on the determination.

In various embodiments, the vehicle network switch is configured to suspend routing of data frames including the source MAC address received at the first port upon the generation of the anomaly event.

In various embodiments, the vehicle includes an intrusion assessment system configured to: receive the first data frame associated with the anomaly event from the CAM; identify at least one anomalous characteristic associated with the first vehicle controller, masquerading as the second vehicle controller, based on the first data frame; and transmit a qualified security event including the at least one anomalous characteristic to a security back office for further analysis.

In various embodiments, the at least one anomalous characteristic comprises the invalid source MAC address and at least one of an invalid source IP address, an invalid payload size, an invalid message rate, an invalid destination MAC address, and an invalid destination IP address.

A system for detecting vehicle controller spoofing includes at least one processor; and at least one memory communicatively coupled to the at least one processor. The at least one memory includes instructions that upon execution by the at least one processor, cause the at least one processor to: receive a first data frame including a source MAC address at a first port of a plurality of ports of a vehicle network switch; retrieve a stored association between the first port and a first media access control (MAC) address from the at least one memory, wherein the first port is designated to only receive data frames from a first vehicle controller of a plurality of vehicle controllers in the vehicle and the first vehicle controller is associated with the first MAC address; determine whether the source MAC address is an invalid source MAC address based on a comparison of the source MAC address with the first MAC address; and generate an anomaly event based on the determination, wherein the anomaly event is indicative of the first vehicle controller masquerading as a second vehicle controller of the plurality of vehicle controllers using a second MAC address as the source MAC address, the second MAC address being associated with the second vehicle controller.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
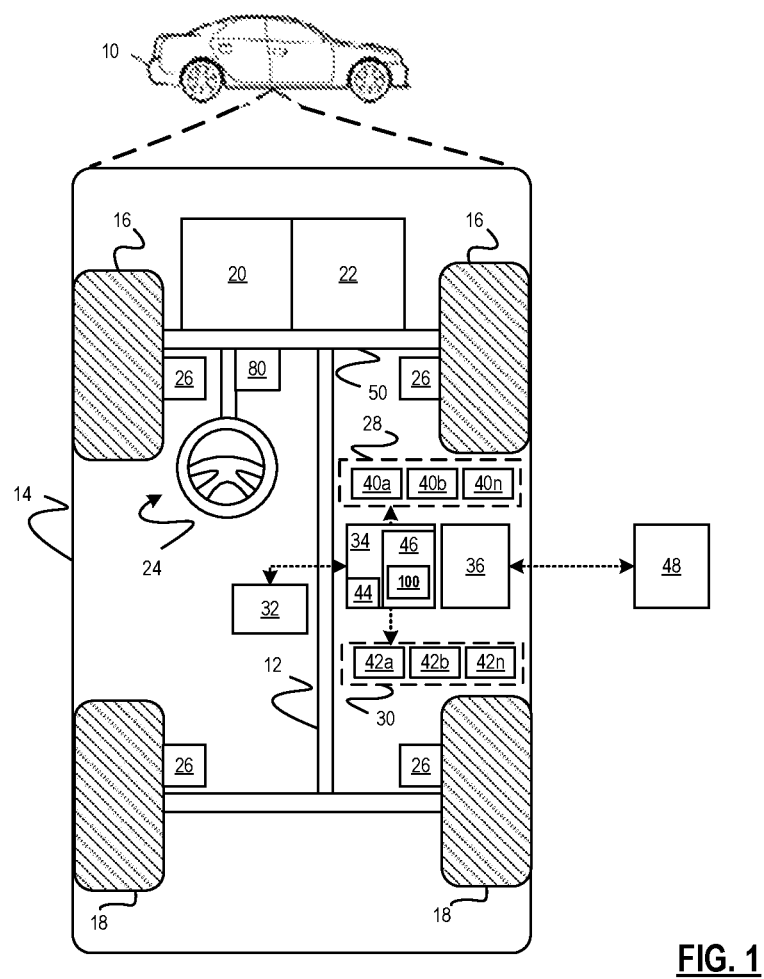
FIG. 1 is a functional block diagram of a vehicle including a vehicle controller spoofing detection system in accordance with at least one embodiment.

Referring to FIG. 1, a functional block diagram of a vehicle 10 including a vehicle controller spoofing detection system 100 in accordance with at least one embodiment is shown. The vehicle 10 generally includes a chassis 12, a body 14, front wheels 16, and rear wheels 18. The vehicle 10 is depicted in the illustrated embodiment as a passenger car, but it should be appreciated that the vehicle controller spoofing detection system 100 may be included within any other vehicle including trucks, sport utility vehicles (SUVs), recreational vehicles (RVs), etc., can also be used.

In various embodiments, the body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The controller 34 is configured to implement an advanced driver assistance system (ADAS). The propulsion system 20 is configured to generate power to propel the vehicle. The propulsion system 20 may, in various embodiments, include an internal combustion engine, an electric machine such as a traction motor, a fuel cell propulsion system, and/or any other type of propulsion configuration. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16-18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16-18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate.

The actuator system 30 includes one or more actuator devices 42a-42n that control one or more vehicle features such as, but not limited to, the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in the ADAS of the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, the controller(s) 34 are configured to implement ADAS.

Figure 2:
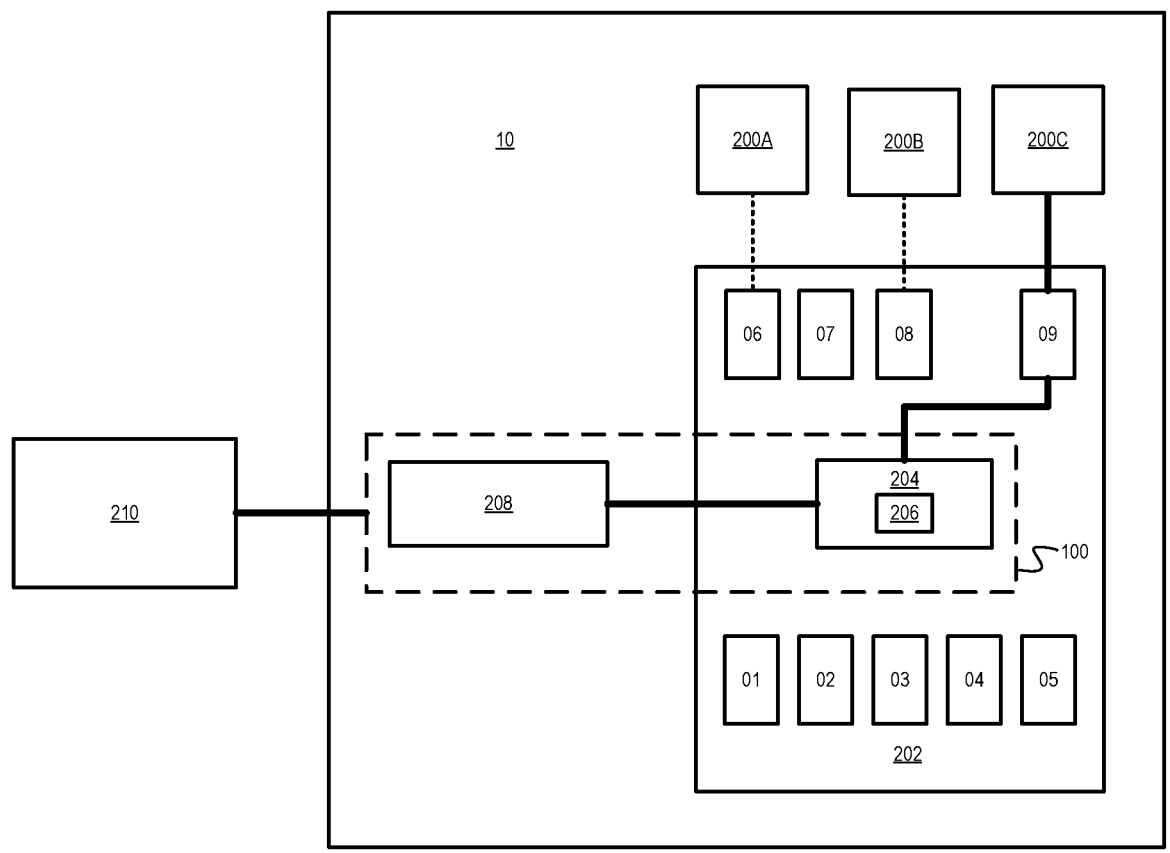
FIG. 2 is a functional block diagram of an exemplary vehicle including a vehicle controller spoofing detection system in accordance with at least one embodiment.

Referring to FIG. 2, a functional block diagram of an exemplary vehicle 10 including a vehicle controller spoofing detection system 100 in accordance with at least one embodiment is shown. In various embodiments, the vehicle 10 is a software defined vehicle (SDV). The vehicle 10 includes a plurality of vehicle controllers 200A, 200B, 200C. The vehicle controller 200A, 200B, 200C are similar to the controller 34 described with reference to FIG. 1. While three vehicle controllers 200A, 200B, 200C are shown, a vehicle 10 typically includes more than three vehicle controllers. The vehicle controllers 200A, 200B, 200C are communicatively coupled to a vehicle network switch 202. The vehicle network switch 202 routes data frames between vehicle controllers 200A, 200B, 200C. An example of a vehicle network switch 202 is an ethernet switch. While a single vehicle network switch 202 is shown, the vehicle 10 includes more than one vehicle network switch 202.

The vehicle network switch 202 includes a plurality of ports 01, 02, 03, 04, 05, 06, 07, 08, 09. Each vehicle controller 200A, 200B, 200C is configured to transmit and receive data frames via a designated port 01, 02, 03, 04, 05, 06, 07, 08, 09 of a vehicle network switch 202. For example, port 06 is designated to only route data frames to and from the vehicle controller 200A, port 08 is designated to only route data frames to and from the vehicle controller 200B, and port 09 is designated to only route data frames to and from the vehicle controller 200C. While the vehicle network switch 202 is shown as including nine ports, a vehicle network switch 202 may include a fewer or greater number of ports. While the vehicle controllers 200A, 200B, 200C are illustrated as communicating via a single vehicle network switch 202, different vehicle controllers 200A, 200B, 200C may communicate via different vehicle network switches 202.

The vehicle network switch 202 includes a content addressable memory (CAM) 204. The CAM 204 includes routing tables that facilitate data frame forwarding operations between the vehicle controllers 200A, 200B, 200C. In various embodiments, the CAM 204 is a ternary content addressable memory (TCAM). Each of the ports 01, 02, 03, 04, 05, 06, 07, 08, 09 of the vehicle network switch 202 is communicatively coupled to the CAM 204. Each vehicle controller 200A, 200B, 200C has a specific MAC address. Each of the ports 01, 02, 03, 04, 05, 06, 07, 08, 09 utilized in the vehicle network switch 202 is tied to a MAC address of a vehicle controller 200A, 200B, 200C. The data packets transmitted by a vehicle controller 200A, 200B, 200C are transmitted to the port 01, 02, 03, 04, 05, 06, 07, 08, 09 that is tied to the MAC address of that vehicle controller 200A, 200B, 200C. The associations between the MAC addresses of the different vehicle controllers 200A, 200B, 200C and the associated port 01, 02, 03, 04, 05, 06, 07, 08, 09 are stored in the CAM 204.

The vehicle controller spoofing detection system 100 is configured to identify an attack on a vehicle controller 200C where the vehicle controller 200C, under adversarial control, is attempting to masquerade as another vehicle controller 200B within the vehicle 10. In this example, the vehicle controller 200B is configured to transmit data frames to the vehicle controller 200A via port 08 and the vehicle controller 200C is configured to transmit data frames to vehicle controller 200A via port 09. The vehicle controller 200C has been compromised by an adversarial attack. The vehicle controller 200C, masquerading as the vehicle controller 200B, and is attempting to transmit data frames to vehicle controller 200A using a source MAC address associated with the vehicle controller 200B via the port 09.

The vehicle controller spoofing detection system 100 includes a source media control access (MAC) address validation module 206 and an intrusion assessment system 208. The CAM 204 includes the source MAC address validation module 206. The CAM 204 is communicatively coupled to the intrusion assessment system 208. In at least one embodiment, a vehicle controller 200A, 200B, 200C includes the intrusion assessment system 208. In at least one embodiment, the intrusion assessment system 208 is a standalone controller 34 within the vehicle 10. The vehicle controller spoofing detection system 100 is configured to be communicatively coupled to a security back office 210.

The source MAC address validation module 206 is configured to determine whether a spoofing attack has occurred on a vehicle controller 200A, 200B, 200C based on a data frame received from the vehicle controller 200A, 200B, 200C at a specific port 01, 02, 03, 04, 05, 06, 07, 08, 09. The source MAC address validation module 206 monitors the source MAC addresses in the data frames received from the vehicle controllers 200A, 200B, 200C at the different ports 01, 02, 03, 04, 05, 06, 07, 08, 09 of the vehicle network switch 202. If the source MAC address validation module 206 determines that a source MAC address in a data frame received at a port 01, 02, 03, 04, 05, 06, 07, 08, 09 does not match the MAC address associated with the vehicle controller 200A, 200B, 200C configured to transmit data frames via that port 01, 02, 03, 04, 05, 06, 07, 08, 09, the source MAC address validation module 206 generates an anomaly event. The anomaly event indicates that a spoofing attack has occurred on the vehicle controller 200A, 200B, 200C associated with the port 01, 02, 03, 04, 05, 06, 07, 08, 09 that received the data frame. The source MAC address validation module 206 transmits the received data frame to the intrusion assessment system 208 to perform forensic analysis on the data frame to identify one or more anomalous characteristics. The anomalous characteristic identified by the intrusion assessment system 208 characterizes the attack. The use of the vehicle controller spoofing detection system 100 may reduce false positives associated with identifying compromised vehicle controllers within a vehicle 10.

Figure 3:
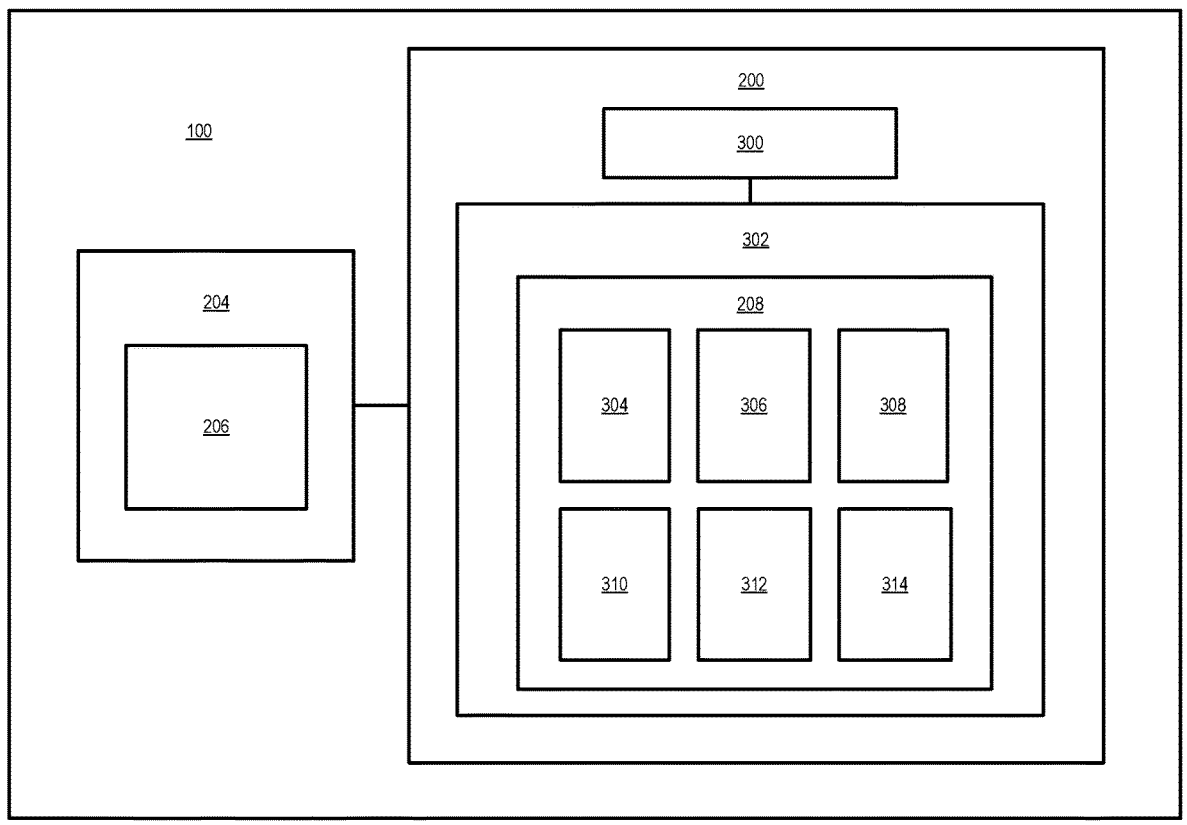
FIG. 3 is a functional block diagram of a vehicle controller spoofing detection system in accordance with at least one embodiment.

Referring to FIG. 3, a functional block diagram of a vehicle controller spoofing detection system 100 in accordance with at least one embodiment is shown. The vehicle controller spoofing detection system 100 includes a source MAC address validation module 206 and an intrusion assessment system 208. A CAM 204 at a vehicle network switch 202 includes the source MAC address validation module 206. In at least one embodiment, the CAM 204 is a TCAM. In at least one embodiment, a vehicle controller 200 includes at least one processor 300 and at least one memory 302. The processor(s) 300 is communicatively coupled to the at least one memory 302. The processor(s) 300 is a programmable device that includes one or more instructions stored in or associated with the at least one memory 302. The at least one memory 302 includes instructions that the processor(s) 300 is configured to execute. The at least one memory 302 includes the intrusion assessment system 208. The intrusion assessment system 208 includes a source IP address module 304, a payload size module 306, a message rate module 308, a destination MAC address module 310, a destination IP address module 312, and a qualified security event transmission module 314. The vehicle controller spoofing detection system 100 may include additional components that facilitate operation of the vehicle controller spoofing detection system 100. The operation of the vehicle controller spoofing detection system 100 will be described in greater detail below.

Figure 4:
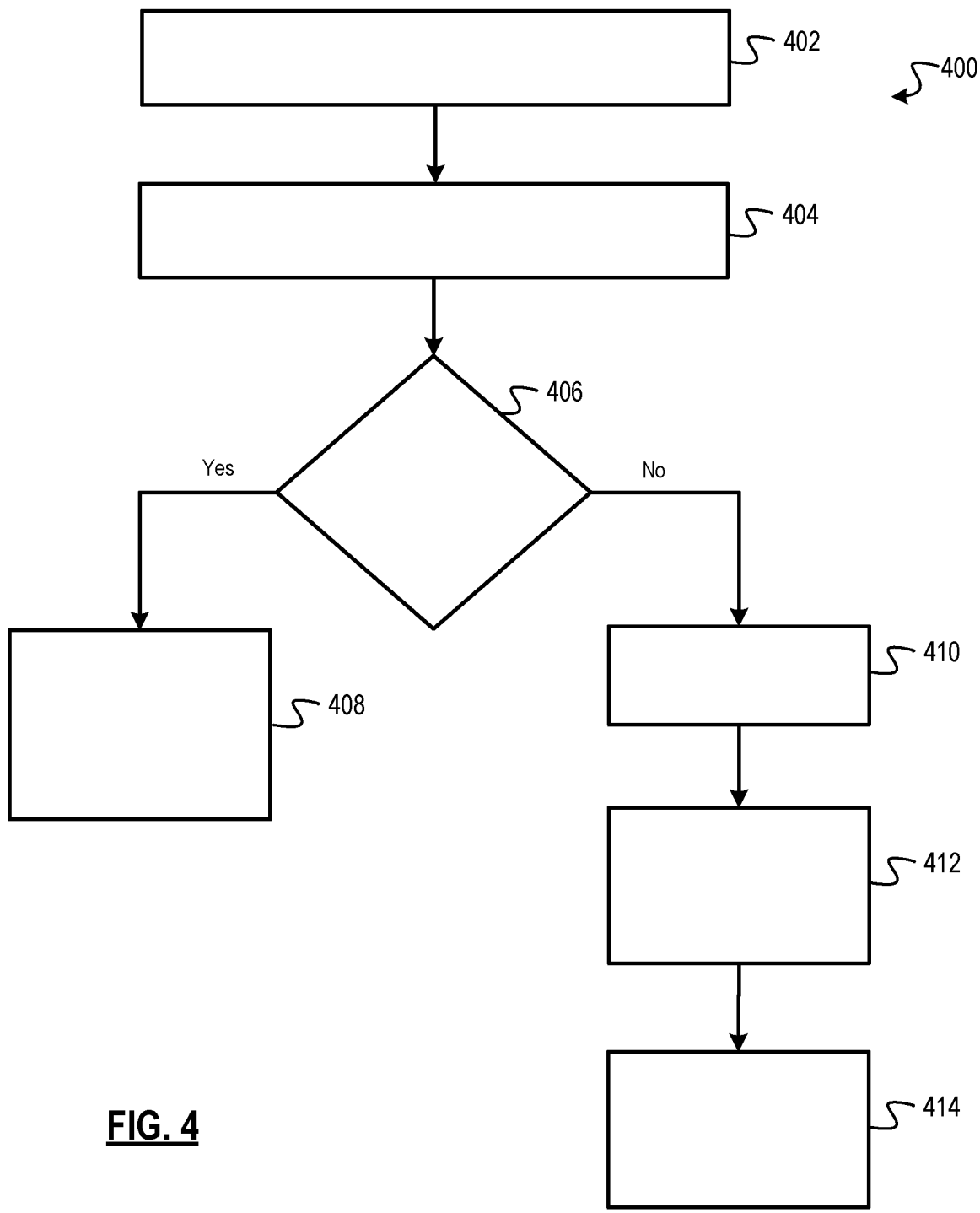
FIG. 4 is a flowchart representation of an exemplary method of identifying a masquerading vehicle controller based on an invalid MAC source address in accordance with at least one embodiment.

Referring to FIG. 4, a flowchart representation of an exemplary method 400 of identifying a masquerading vehicle controller 200C based on an invalid source MAC address in accordance with at least one embodiment is shown. The method 400 will be described with reference to an exemplary implementation of the vehicle controller spoofing detection system 100. In various embodiments, the method 400 is implemented by a CAM 204 including a source MAC address validation module 206 As can be appreciated in light of the disclosure, the order of operation within the method 400 is not limited to the sequential execution as illustrated in FIG. 4 but may be performed in one or more varying orders as applicable and in accordance with the present disclosure. The method 400 will be described with reference to the example illustrated in FIG. 2.

At 402, a data frame is received from a vehicle controller 200C at a port 09 of a vehicle network switch 202. At the 404, the data frame is received at a CAM 204 of the vehicle network switch 202. The CAM 204 includes routing tables that facilitate data frame forwarding operations between the vehicle controllers 200A, 200B, 200C. Each vehicle controller 200A, 200B, 200C is associated with a MAC address. A MAC address is a unique identifier that is used to identify individual vehicle controllers 200A, 200B, 200C within a vehicle network. Each utilized port 01, 02, 03, 04, 05, 06, 07, 08, 09 of the vehicle network switch 202 is designated to only receive data frames from a specific vehicle controller 200A, 200B, 200C in the vehicle 10. The CAM 204 stores one or more routing tables that define the associations between the individual ports 01, 02, 03, 04, 05, 06, 07, 08, 09 of the vehicle network switch 202 and the MAC addresses of the vehicle controllers 200A, 200B, 200C associated with that port 01, 02, 03, 04, 05, 06, 07, 08, 09. Each data frame includes a source MAC address. A source MAC address identifies the vehicle controller 200A, 200B, 200C that transmitted the data frame.

At 406, the source MAC address validation module 206 at the CAM 204 determines whether the source MAC address in the received data frame is a valid source MAC address. When a data frame is received at a port 01, 02, 03, 04, 05, 06, 07, 08, 09 of the vehicle network switch 202, the source MAC address validation module 206 compares the source MAC address in the received data frame with the MAC address of the vehicle controller 200A, 200B, 200C associated with that port 01, 02, 03, 04, 05, 06, 07, 08, 09 as defined by the routing table(s) in the CAM 204 to make the determination.

If the source MAC address validation module 206 determines that the source MAC address in the received the data frame matches the MAC address associated with the port 01, 02, 03, 04, 05, 06, 07, 08, 09 that received the data frame as defined by the routing table(s) in the CAM 204, the source MAC address validation module 206 determines that the source MAC address in the received data frame is a valid source MAC address. The data frame includes a destination MAC address associated with a destination device. An example of a destination device is another vehicle controller 200A, 200B, 200C. At 408, if the source MAC address in the data frame is determined to be a valid source MAC address, the CAM 204 routes the data frame to the destination device associated with the destination MAC address in the data frame via the port 01, 02, 03, 04, 05, 06, 07, 08, 09 associated with the destination MAC address as defined by the routing table(s) in the CAM 204.

Referring back to the example in FIG. 2, the port 09 is designated to only receive data frames from the vehicle controller 200C. A routing table in the CAM 204 defines an association between the MAC address of the vehicle controller 200C and the port 09. A data frame is received from the vehicle controller 200C at the port 09. The data frame includes the source MAC address of the vehicle controller 200C. The source MAC address validation module 206 determines that the source MAC address is valid because the source MAC address in the received the data frame matches the MAC address of the vehicle controller 200C associated with the port 09. The data frame includes a destination MAC address associated with a destination device. The CAM 204 routes the received data frame to the destination device associated with the destination MAC address. The destination device in this example is the vehicle controller 200A and the MAC destination address is the MAC address associated with the vehicle controller 200A.

Referring back to FIG. 3, if the source MAC address validation module 206 determines that the source MAC address in the received the data frame does not match the MAC address associated with the port 01, 02, 03, 04, 05, 06, 07, 08, 09 that received the data frame as defined by the routing table(s) in the CAM 204, the source MAC address validation module 206 determines that the source MAC address in the received data frame is an invalid source MAC address at 406.

If the source MAC address in the data frame is determined to be an invalid source MAC address, the source MAC address validation module 206 generates an anomaly event at 410. The anomaly event indicates that the vehicle controller 200A, 200B, 200C that transmitted the data frame including the invalid source MAC address is masquerading as another vehicle controller 200A, 200B, 200C that has as MAC address that is the same as the invalid source MAC address in the data frame. At 412, the source MAC address validation module 206 transmits the received data frame including the invalid MAC source address to the intrusion assessment system 208. At 414, the CAM 204 suspends the routing of data frames including the invalid MAC source address that are received at the port 01, 02, 03, 04, 05, 06, 07, 08, 09 that received the data frame including the invalid source MAC address.

Referring back to the example in FIG. 2, the port 09 is designated to only receive data frames from vehicle controller 200C. The vehicle controller 200C has a unique MAC address. A routing table in the CAM 204 defines an association between the MAC address of the vehicle controller 200C and the port 09. The vehicle controller 200B has a unique MAC address. A routing table in the CAM 204 defines an association between the MAC address of the vehicle controller 200B and the port 08.

A data frame including a source MAC address was received from the vehicle controller 200C at the port 09. The source MAC address in the data frame transmitted by vehicle controller 200C and received at the port 09 is associated with the vehicle controller 200B. The source MAC address validation module 206 determined that the source MAC address in the received data frame did not match the MAC address of the vehicle controller 200C that transmitted the data frame to port 09. The source MAC address validation module 206 determined that the source MAC address in the received data frame was invalid because the source MAC address in the received data frame did not match the MAC address of the vehicle controller 200C associated with the port 09 in the routing table. The source MAC address validation module 206 determined that the source MAC address in the received data frame corresponded to the MAC address associated with the vehicle controller 200B indicating that the vehicle controller 200C was masquerading as the vehicle controller 200B by using the MAC address associated with the vehicle controller 200B as a source MAC address in data frames transmitted by the vehicle controller 200C. The source MAC address validation module 206 generated an anomaly event. The anomaly event indicated that the vehicle controller 200C that transmitted the data frame including the invalid source MAC address is masquerading as the vehicle controller 200B having the MAC address that corresponds to the invalid source MAC address in the data frame.

The source MAC address validation module 206 transmitted the received data frame including the invalid MAC source address to the intrusion assessment system 208. The CAM 204 suspended the routing of data frames including the invalid MAC source address associated with the vehicle controller 200B that are received at the port 09. The anomaly event indicated that the vehicle controller 200C may be under adversarial control and may be masquerading as a different vehicle controller 200B in an attempt to circumvent access controls in the vehicle 10.

Figure 5:
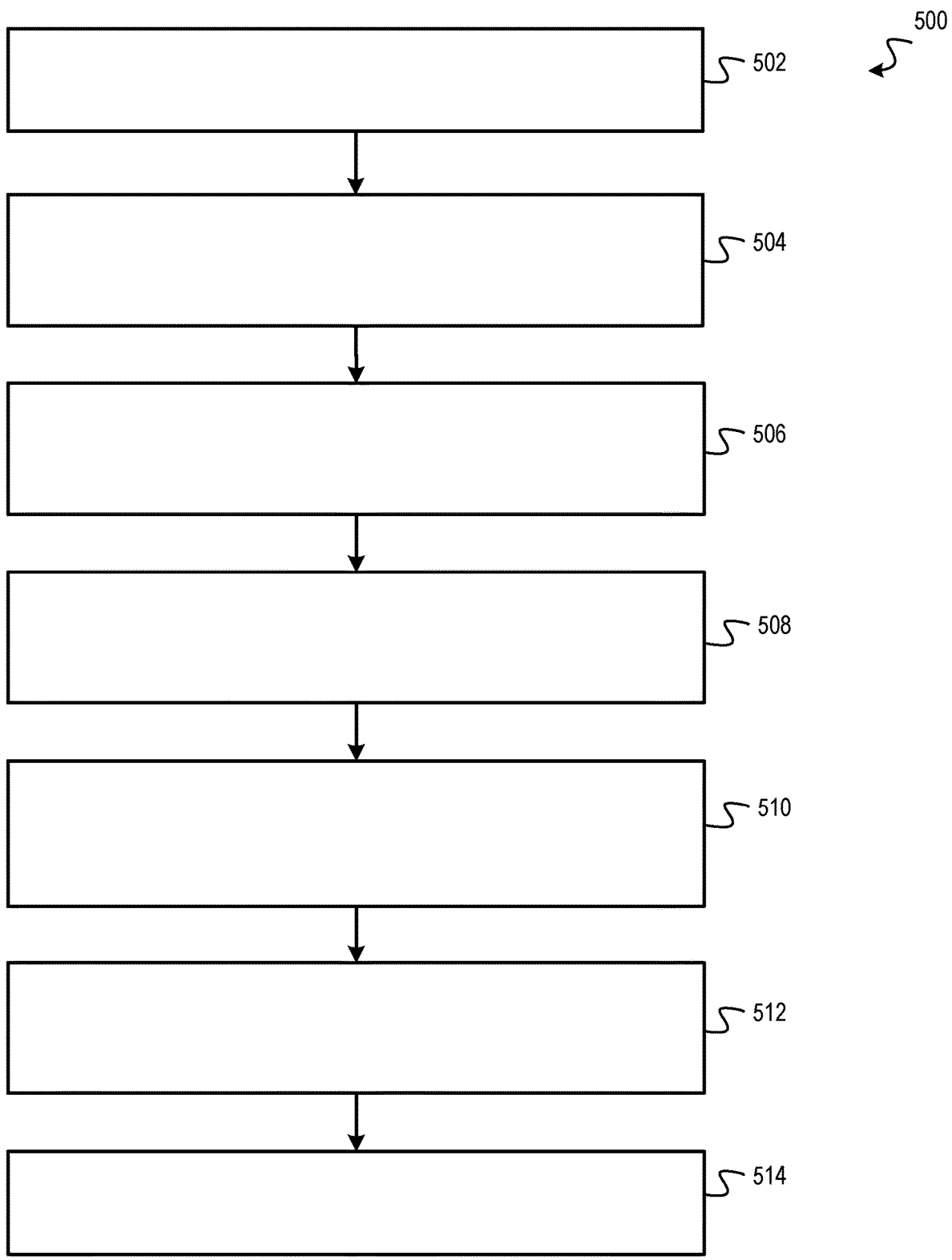
FIG. 5 is a flowchart representation of an exemplary method of identifying anomalous characteristics of data frames generated by a masquerading vehicle controller in accordance with at least one embodiment.

Referring to FIG. 5, a flowchart representation of an exemplary method 500 of identifying anomalous characteristics of data frames generated by a masquerading vehicle controller 200C in accordance with at least one embodiment is shown. The method 500 will be described with reference to an exemplary implementation of the vehicle controller spoofing detection system 100. In at least one embodiment, the method 500 is implemented by an intrusion assessment system 208. As can be appreciated in light of the disclosure, the order of operation within the method 500 is not limited to the sequential execution as illustrated in FIG. 5 but may be performed in one or more varying orders as applicable and in accordance with the present disclosure. The method 500 will be described with reference to the example illustrated in FIG. 2.

At 502, the intrusion assessment system 208 receives the data frame associated with the anomaly event from the source MAC address validation module 206 at the CAM 204. The anomaly event was generated in response to the source MAC address validation module 206 determining that the source MAC address in the data frame was an invalid source MAC address. The anomaly event indicated that the vehicle controller 200C was compromised by an adversarial attack and was masquerading as the vehicle controller 200B by using the MAC address associated with the vehicle controller 200B as the source MAC address in the data frames transmitted by the vehicle controller 200C to the port 09 of the vehicle network switch 202. The intrusion assessment system 208 performs forensic analysis on the data frame generated by the compromised vehicle controller 200C to identify one or more anomalous characteristics associated with the adversarial attack involving the masquerading vehicle controller 200C.

The data frame includes a source IP address. At 504, the source IP address module 304 generates an invalid source IP address qualified security event if the source IP address in the data frame does not match the IP address of the vehicle controller 200C that transmitted the data frame to the port 09. Each of the vehicle controllers 200A, 200B, 200C in the vehicle 10 is associated with an IP address. The associations between each of the vehicle controllers 200A, 200B, 200C and the IP addresses are stored at the source IP address module 304.

The source IP address module 304 retrieves the IP address associated with the vehicle controller 200C that transmitted the data frame to the port 09. The source IP address module 304 determines whether the source IP address in the data frame matches the IP address associated with the vehicle controller 200C associated with the port 09. If the source IP address module 304 determines that the source IP address in the data frame does not match the IP address associated with the vehicle controller 200C that transmitted the data frame to the port 09, the source IP address module 304 generates the qualified security event indicating that the compromised vehicle controller 200C is masquerading as the vehicle controller 200B having an IP address that is the same as the IP source address in the data frame. The vehicle controller 200C is masquerading as the vehicle controller 200B using an invalid source IP address.

The data frame includes a payload. At 506, the payload size module 306 generates an invalid payload size qualified security event if the payload size of the payload in the data frame is greater than a payload size threshold associated with the vehicle controller 200C associated with the port 09 that received the data frame. Each of the vehicle controllers 200A, 200B, 200C in the vehicle 10 is associated with a payload size threshold. Each vehicle controller 200A, 200B, 200C is configured to transmit payloads that are less than or equal to the associated payload size threshold. The associations between each of the vehicle controllers 200A, 200B, 200C and the payload size thresholds are stored at the payload size module 306.

The payload size module 306 retrieves the stored association between the vehicle controller 200C associated with the port 09 that received the data frame and the payload size threshold. The payload size module 306 determines whether the payload size of the payload in the data frame is greater than the payload size threshold associated with the vehicle controller 200C that transmitted the data frame to the port 09. If the payload size module 306 determines that payload size of the payload in the data frame is greater than the payload size threshold, the payload size module 306 generates the qualified security event indicating that the compromised vehicle controller 200C, masquerading as the vehicle controller 200B, is transmitting payloads having an invalid payload size.

At 508, the message rate module 308 generates an invalid message rate qualified security event if the message rate associated with the data frame is greater than a message rate threshold associated with the vehicle controller 200C associated with the port 09 that received the data frame. Each of the vehicle controllers 200A, 200B, 200C in the vehicle 10 is associated with a message rate threshold. Each vehicle controller 200A, 200B, 200C is configured to transmit data frames that are less than or equal to the associated message rate threshold. The associations between each of the vehicle controllers 200A, 200B, 200C and the message rate thresholds are stored at the message rate module 308.

The message rate module 308 retrieves the stored association between the vehicle controller 200C associated with the port 09 that received the data frame and the message rate threshold. The message rate module 308 determines whether the message rate associated with the data frame is greater than the message rate threshold associated with the vehicle controller 200C that transmitted the data frame to the port 09. If the message rate module 308 determines that the message rate associated with the data frame is greater than the message rate threshold, the message rate module 308 generates the qualified security event indicating that the compromised vehicle controller 200C, masquerading as the vehicle controller 200B, is transmitting data frames at an invalid message rate.

The data frame includes a destination MAC address. At 510, the destination MAC address module 310 generates an invalid destination MAC address qualified security event if the destination MAC address in the data frame does not match a destination MAC address associated with the vehicle controller 200C associated with the port 09 that received the data frame. Each of the vehicle controllers 200A, 200B, 200C in the vehicle 10 is configured to transmit data frames to one or more destination devices. Each destination device is associated with a MAC address. An example of a destination device is a vehicle controller 200A, 200B, 200C. The associations between each of the vehicle controllers 200A, 200B, 200C and the one or more destination MAC addresses are stored at the destination MAC address module 310.

The destination MAC address module 310 retrieves the stored associations between the destination MAC addresses and the vehicle controller 200C that transmitted the data frame to the port 09. The destination MAC address module 310 determines whether the destination MAC address in the data frame matches a destination MAC address associated with the vehicle controller 200C that transmitted the data frame to the port 09. If the destination MAC address module 310 determines that the destination MAC address in the data frame does not match a destination MAC address associated with the vehicle controller 200C associated with the port 09 that received the data frame, the destination MAC address module 310 generates the qualified security event indicating that the compromised vehicle controller 200C is masquerading as the vehicle controller 200B using an invalid destination MAC address.

The data frame includes a destination IP address. At 512, the destination IP address module 312 generates an invalid destination IP address qualified security event if the destination IP address in the data frame does not match a destination IP address associated with the vehicle controller 200C associated with the port 09 that received the data frame. Each of the vehicle controllers 200A, 200B, 200C in the vehicle 10 is configured to transmit data frames to one or more destination devices. Each destination device is associated with an IP address. An example of a destination device is a vehicle controller 200A, 200B, 200C. The associations between each of the vehicle controllers 200A, 200B, 200C and the one or more destination IP addresses are stored at the destination IP address module 312.

The destination IP address module 312 retrieves the stored associations between the destination IP addresses and the vehicle controller 200C that transmitted the data frame to the port 09. The destination IP address module 312 determines whether the destination IP address in the data frame matches a destination IP address associated with the vehicle controller 200C associated with the port 09 that received the data frame. If the destination IP address module 312 determines that the destination IP address in the data frame does not match a destination IP address associated with the vehicle controller 200C that transmitted the data frame to the port 09, the destination IP address module 312 generates the qualified security event indicating that the compromised vehicle controller 200C is masquerading as the vehicle controller 200B using an invalid destination IP address.

At 514, the qualified security event transmission module 314 transmits the generated qualified security event(s) generated by the intrusion assessment system 208 to a security back office 210 for further analysis. The qualified security event transmission module 314 receives the qualified security events generated by one or more of the source IP address module 304, the payload size module 306, the message rate module 308, the destination MAC address module 310, and the destination IP address module 312. The qualified security event(s) define the one or more anomalous characteristics identified by the intrusion assessment system 208. The anomalous characteristics include the invalid source MAC address and one or more of an invalid source IP address, an invalid payload size, an invalid message rate, an invalid destination MAC address, and an invalid destination IP address.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for detecting vehicle controller spoofing in a vehicle comprising:
   receiving a first data frame including a source media access control (MAC) address at a first port of a plurality of ports of a vehicle network switch;
   retrieving a stored association between the first port and a first MAC address from at least one memory, wherein the first port is designated to only receive data frames from a first vehicle controller of a plurality of vehicle controllers in the vehicle and the first vehicle controller is associated with the first MAC address;
   determining whether the source MAC address is an invalid source MAC address based on a comparison of the source MAC address with the first MAC address;
   generating an anomaly event based on the determination, wherein the anomaly event is indicative of the first vehicle controller masquerading as a second vehicle controller of the plurality of vehicle controllers using a second MAC address as the source MAC address, the second MAC address being associated with the second vehicle controller;
   receiving the first data frame associated with the anomaly event from a ternary content addressable memory (TCAM) of the vehicle network switch;
   identifying at least one anomalous characteristic associated with the first vehicle controller masquerading as the second vehicle controller, based on the first data frame; and
   transmitting a qualified security event including the at least one anomalous characteristic to a security back office for further analysis.

2. The method of claim 1, further comprising:
   retrieving a stored association between the first vehicle controller and a first Internet Protocol (IP) address from the at least one memory;
   determining whether a source IP address received in the first data frame is an invalid source IP address based on whether the source IP address matches the first IP address; and
   generating the qualified security event based on the determination, wherein the qualified security event indicates that the first vehicle controller is masquerading as the second vehicle controller using a second IP address as the source IP address, the second IP address being associated with the second vehicle controller.

3. The method of claim 1, further comprising:
   retrieving a stored association between the first vehicle controller and a payload size threshold from the at least one memory, the first vehicle controller being configured to transmit payloads having a payload size that are less than or equal to the payload size threshold;
   determining whether a first payload size of a first payload received in the first data frame is greater than the payload size threshold; and generating the qualified security event indicating that the first vehicle controller, masquerading as the first second controller, is transmitting payloads having an invalid payload size based on the determination.

4. The method of claim 1 further comprising:
retrieving a stored association between the first vehicle controller and a message rate threshold from the at least one memory, the first vehicle controller being configured to transmit the data frames at message rates that are less than or equal to the message rate threshold;
determining whether a source message rate associated with the first data frame is greater than the message rate threshold; and
generating the qualified security event indicating that the first vehicle controller, masquerading as the second vehicle controller, is transmitting the data frames at an invalid message rate based on the determination.

5. The method of claim 1 further comprising:
retrieving a stored association between the first vehicle controller and at least one destination MAC address from the at least one memory, wherein the first vehicle controller is configured to transmit the data frames comprising one of the at least one destination MAC address and each of the at least one destination MAC address is associated with a destination device;
determining whether a first destination MAC address received in the first data frame matches one of the at least one destination MAC addresses associated with the first vehicle controller; and
generating the qualified security event indicating that the first vehicle controller, masquerading as the second vehicle controller, is transmitting the data frames using an invalid destination MAC address based on the determination.

6. The method of claim 1 further comprising:
retrieving a stored association between the first vehicle controller and at least one destination IP address from the at least one memory, wherein the first vehicle controller is configured to transmit the data frames comprising one of the at least one destination IP address and each of the at least one destination IP address is associated with a destination device;
determining whether a first destination IP address received in the first data frame matches one of the at least one destination IP addresses associated with the first vehicle controller; and
generating the qualified security event indicating that the first vehicle controller, masquerading as the second vehicle controller, is transmitting the data frames using an invalid destination IP address based on the determination.

7. The method of claim 1, further comprising suspending routing of data frames including the source MAC address received at the first port upon the generation of the anomaly event.

8. The method of claim 1, wherein the at least one anomalous characteristic comprises the invalid source MAC address and at least one of an invalid source IP address, an invalid payload size, an invalid message rate, an invalid destination MAC address, and an invalid destination IP address.

9. A vehicle configured to detect vehicle controller spoofing comprising:
a plurality of vehicle controllers including first and second vehicle controllers;
a vehicle network switch comprising a plurality of ports, wherein a first port of the plurality of ports is designated to only receive data frames from the first vehicle controller and the first vehicle controller is associated with a first media access control (MAC) address; and
a content addressable memory (CAM) configured to:
receive a first data frame including a source MAC address at the first port;
retrieve a stored association between the first port and the first MAC address;
determine whether the source MAC address is an invalid source MAC address based on a comparison of the source MAC address with the first MAC address;
generate an anomaly event based on the determination, wherein the anomaly event is indicative of the first vehicle controller masquerading as the second vehicle controller using a second MAC address as the source MAC address, the second MAC address being associated with the second vehicle controller;
receive the first data frame associated with the anomaly event from a ternary content addressable memory (TCAM) of the vehicle network switch;
identify at least one anomalous characteristic associated with the first vehicle controller masquerading as the second vehicle controller, based on the first data frame; and
transmit a qualified security event including the at least one anomalous characteristic to a security back office for further analysis.

10. The vehicle of claim 9, further comprising an intrusion assessment system and wherein:
the first vehicle controller is associated with a first Internet Protocol (IP) address;
the CAM is configured to transmit the first data frame associated with the anomaly event to the intrusion assessment system, the first data frame including a source IP address; and
the intrusion assessment system is configured to:
retrieve a stored association between the first vehicle controller and the first IP address from at least one memory at the intrusion assessment system;
determine whether the source IP address is an invalid source IP address based on whether the source IP address matches the first IP address; and
generate the qualified security event based on the determination, wherein the qualified security event indicates that the first vehicle controller is masquerading as the second vehicle controller using a second IP address, the second IP address being associated with the second vehicle controller.

11. The vehicle of claim 9, further comprising an intrusion assessment system and wherein:
the first vehicle controller is configured to transmit payloads having a payload size that are less than or equal to a payload size threshold;
the CAM is configured to transmit the first data frame associated with the anomaly event to the intrusion assessment system, the first data frame including a first payload; and
the intrusion assessment system is configured to:
retrieve a stored association between the first vehicle controller and the payload size threshold from at least one memory at the intrusion assessment system;
determine whether a first payload size of the first payload is greater than the payload size threshold; and
generate the qualified security event indicating that the first vehicle controller, masquerading as the second vehicle controller, is transmitting payloads having an invalid payload size based on the determination.

12. The vehicle of claim 9, further comprising an intrusion assessment system and wherein:
the first vehicle controller is configured to transmit the data frames at message rates that are less than or equal to a message rate threshold;
the CAM is configured to transmit the first data frame associated with the anomaly event to the intrusion assessment system; and
the intrusion assessment system is configured to:
retrieve a stored association between the first vehicle controller and the message rate threshold from at least one memory at the intrusion assessment system;
determine whether a source message rate associated with the first data frame is greater than the message rate threshold; and
generate the qualified security event indicating that the first vehicle controller, masquerading as the second vehicle controller, is transmitting the data frames at an invalid message rate based on the determination.

13. The vehicle of claim 9, further comprising an intrusion assessment system and wherein:
the first vehicle controller is configured to transmit the data frames comprising one of at least one destination MAC address, each of the at least one destination MAC address being associated with a destination device;
the CAM is configured to transmit the first data frame associated with the anomaly event to the intrusion assessment system, the first data frame including a first destination MAC address; and
the intrusion assessment system is configured to:
retrieve stored associations between the first vehicle controller and the at least one destination MAC address from at least one memory at the intrusion assessment system;
determine whether the first destination MAC address matches one of the at least one destination MAC addresses associated with the first vehicle controller; and
generate the qualified security event indicating that the first vehicle controller, masquerading as the second vehicle controller, is transmitting the data frames using an invalid destination MAC address based on the determination.

14. The vehicle of claim 9, further comprising an intrusion assessment system and wherein:
the first vehicle controller is configured to transmit the data frames comprising one of at least one destination IP address, each of the at least one destination IP address being associated with a destination device;
the CAM is configured to transmit the first data frame associated with the anomaly event to the intrusion assessment system, the first data frame including a first destination IP address; and
the intrusion assessment system is configured to:
retrieve stored associations between the first vehicle controller and the at least one destination IP address from at least one memory at the intrusion assessment system;
determine whether the first destination IP address matches one of the at least one destination IP addresses associated with the first vehicle controller; and
generate the qualified security event indicating that the first vehicle controller, masquerading as second first vehicle controller, is transmitting the data frames using an invalid destination IP address based on the determination.

15. The vehicle of claim 9, wherein the vehicle network switch is configured to suspend routing of data frames including the source MAC address received at the first port upon the generation of the anomaly event.

16. The vehicle of claim 9, wherein the at least one anomalous characteristic comprises the invalid source MAC address and at least one of an invalid source IP address, an invalid payload size, an invalid message rate, an invalid destination MAC address, and an invalid destination IP address.

17. A system for detecting vehicle controller spoofing comprising:
at least one processor; and
at least one memory communicatively coupled to the at least one processor, the at least one memory comprising instructions that upon execution by the at least one processor, cause the at least one processor to:
receive a first data frame including a source media access control (MAC) address at a first port of a plurality of ports of a vehicle network switch;
retrieve a stored association between the first port and a first MAC address from the at least one memory, wherein the first port is designated to only receive data frames from a first vehicle controller of a plurality of vehicle controllers in the vehicle and the first vehicle controller is associated with the first MAC address;
determine whether the source MAC address is an invalid source MAC address based on a comparison of the source MAC address with the first MAC address;
generate an anomaly event based on the determination, wherein the anomaly event is indicative of the first vehicle controller masquerading as a second vehicle controller of the plurality of vehicle controllers using a second MAC address as the source MAC address, the second MAC address being associated with the second vehicle controller
receive the first data frame associated with the anomaly event from a ternary content addressable memory (TCAM) of the vehicle network switch;
identify at least one anomalous characteristic associated with the first vehicle controller masquerading as the second vehicle controller, based on the first data frame; and
transmit a qualified security event including the at least one anomalous characteristic to a security back office for further analysis.

18. The system of claim 17, wherein the at least one memory further comprises instructions that upon execution by the at least one processor, cause the at least one processor to:
retrieve a stored association between the first vehicle controller and a first Internet Protocol (IP) address from the at least one memory;
determine whether a source IP address received in the first data frame is an invalid source IP address based on whether the source IP address matches the first IP address; and
generate the qualified security event based on the determination, wherein the qualified security event indicates that the first vehicle controller is masquerading as the second vehicle controller using a second IP address as the source IP address, the second IP address being associated with the second vehicle controller.

19. The system of claim 17, wherein the at least one memory further comprises instructions that upon execution by the at least one processor, cause the at least one processor to:
retrieve a stored association between the first vehicle controller and a payload size threshold from the at least one memory, the first vehicle controller being configured to transmit payloads having a payload size that are less than or equal to the payload size threshold;
determine whether a first payload size of a first payload received in the first data frame is greater than the payload size threshold; and
generate the qualified security event indicating that the first vehicle controller, masquerading as the first second controller, is transmitting payloads having an invalid payload size based on the determination.

20. The system of claim 17, wherein the at least one memory further comprises instructions that upon execution by the at least one processor, cause the at least one processor to:
retrieve a stored association between the first vehicle controller and a message rate threshold from the at least one memory, the first vehicle controller being configured to transmit the data frames at message rates that are less than or equal to the message rate threshold;
determine whether a source message rate associated with the first data frame is greater than the message rate threshold; and
generate the qualified security event indicating that the first vehicle controller, masquerading as the second vehicle controller, is transmitting the data frames at an invalid message rate based on the determination.

* * * * *